Sept. 12, 1950 R. H. EVANS 2,522,027
PULVERIZER ARRANGED FOR RECIRCULATION
AND CLASSIFICATION OF MATERIAL
Filed July 10, 1945 6 Sheets-Sheet 6
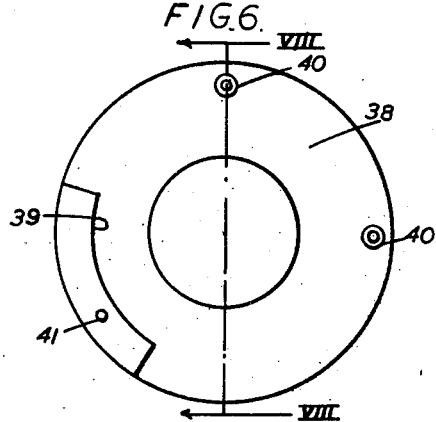
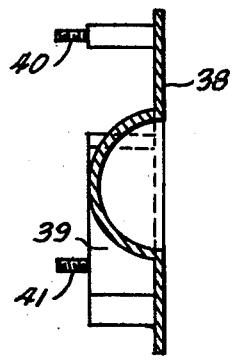
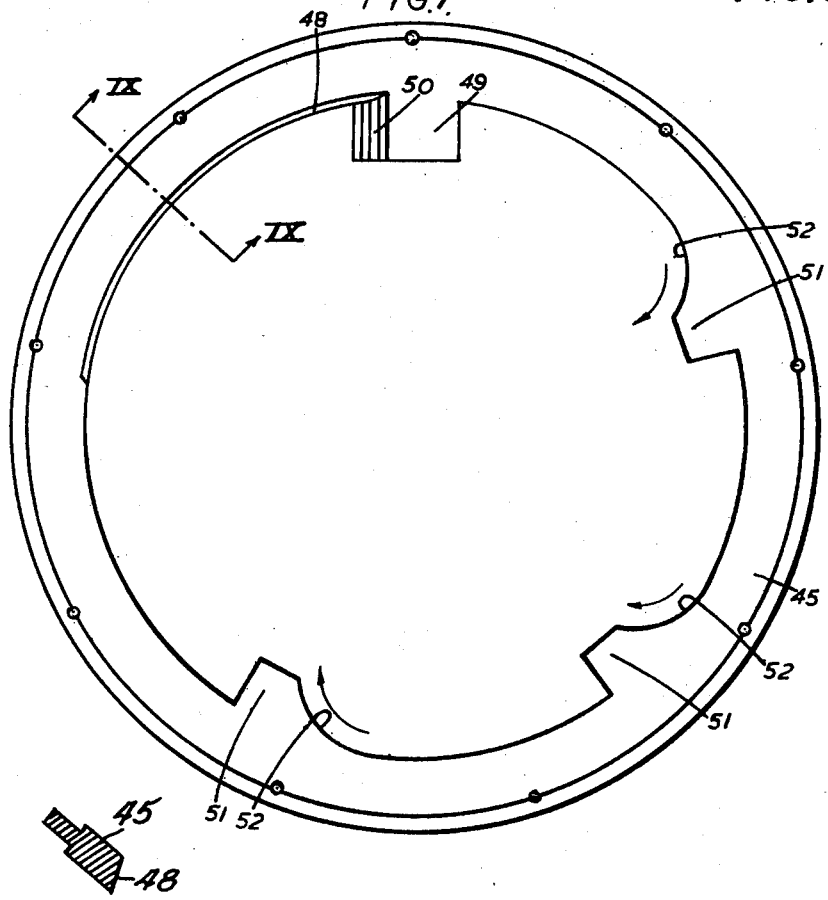
Inventor
Richard Henry Evans
By
Attorney Patented Sept. 12, 1950

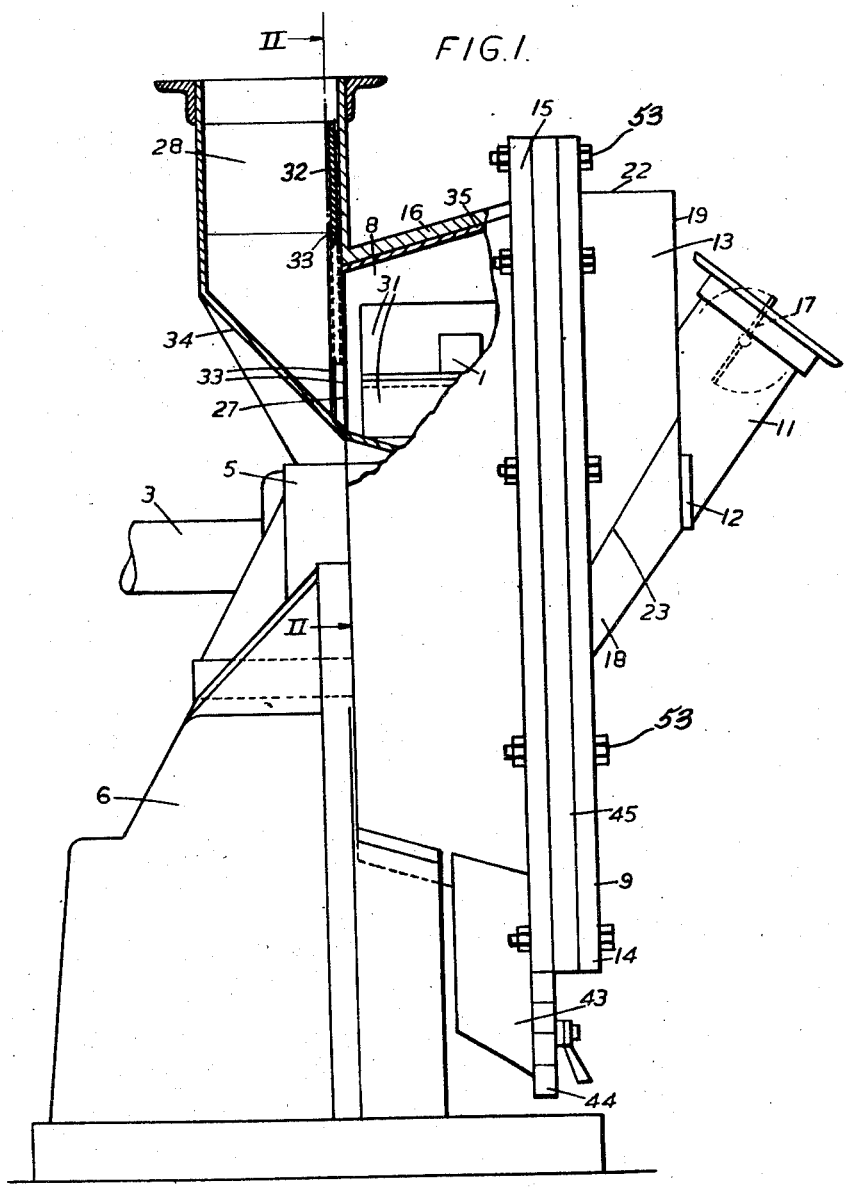

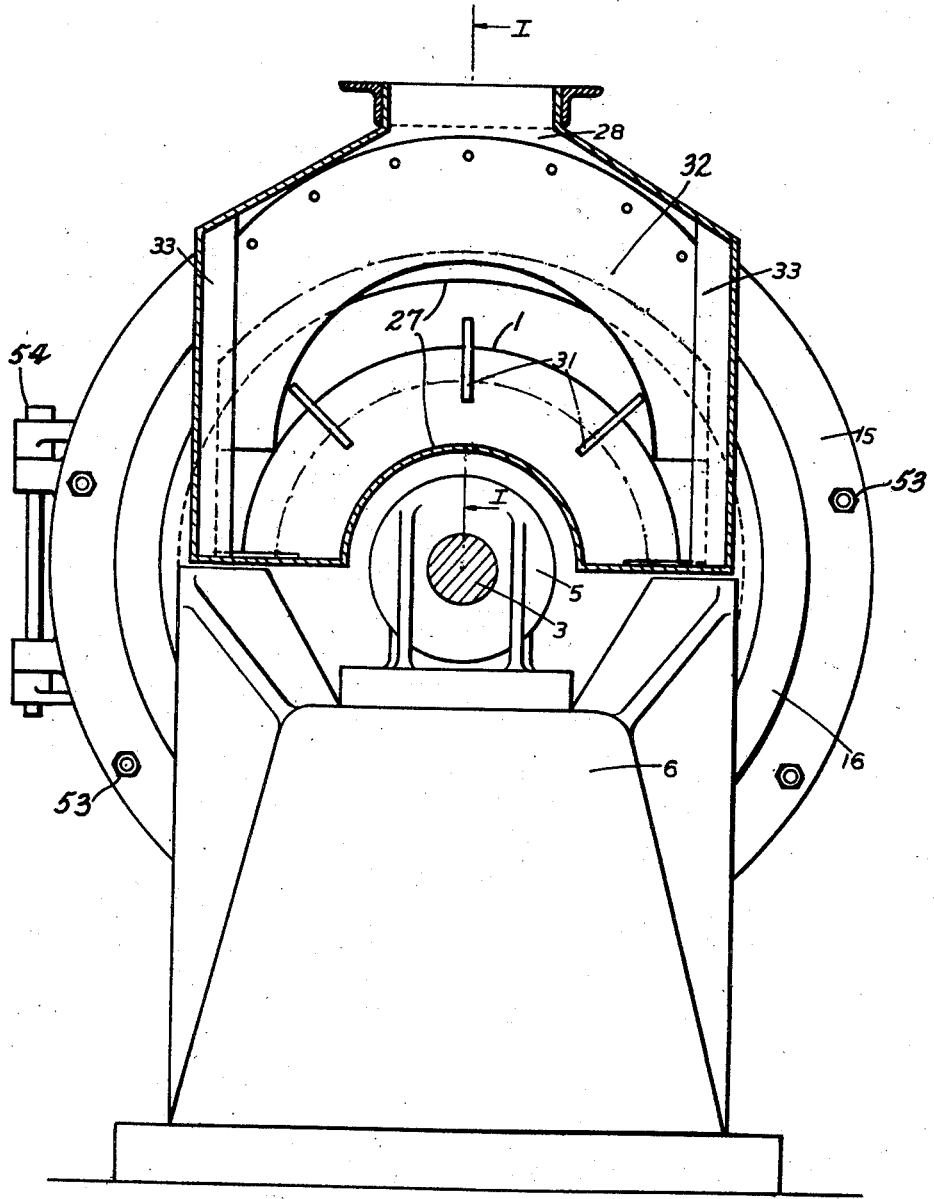

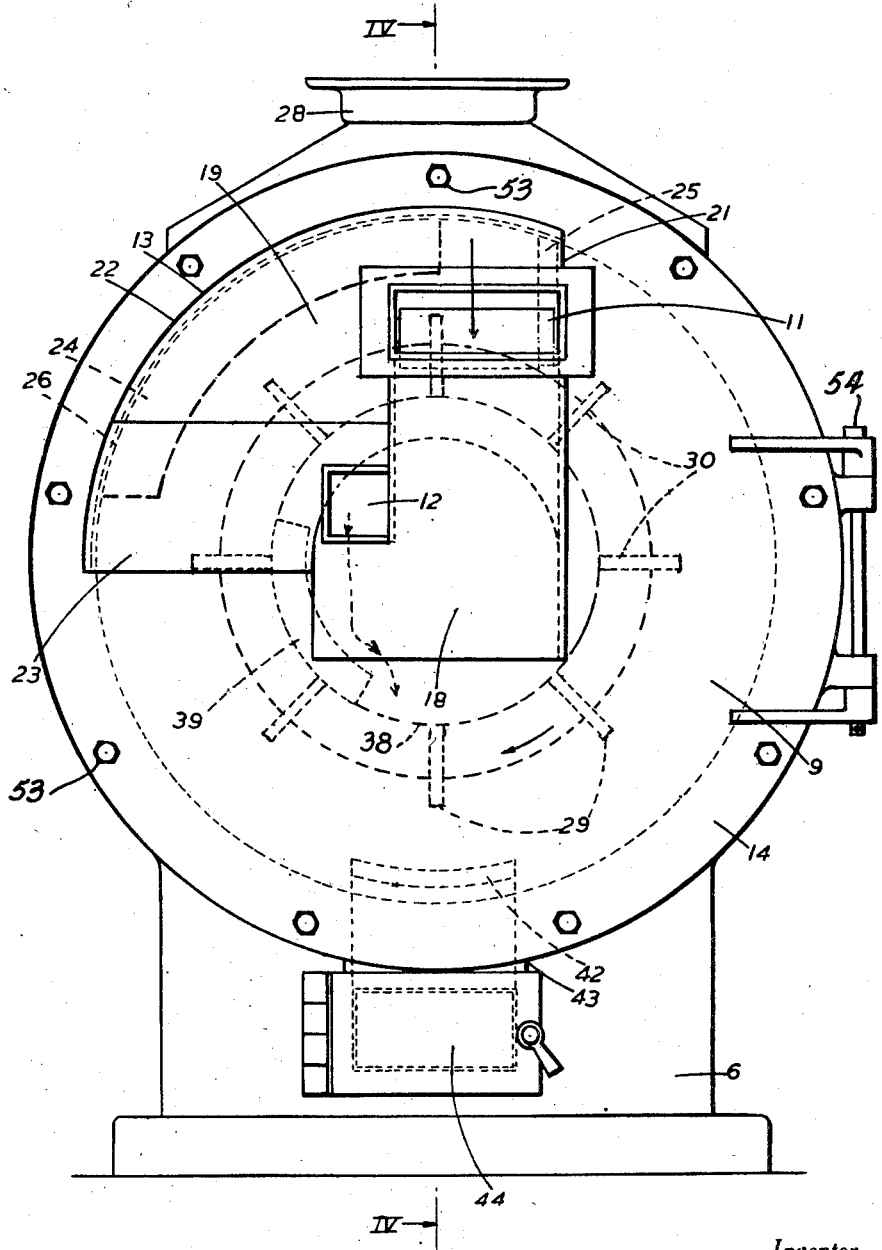

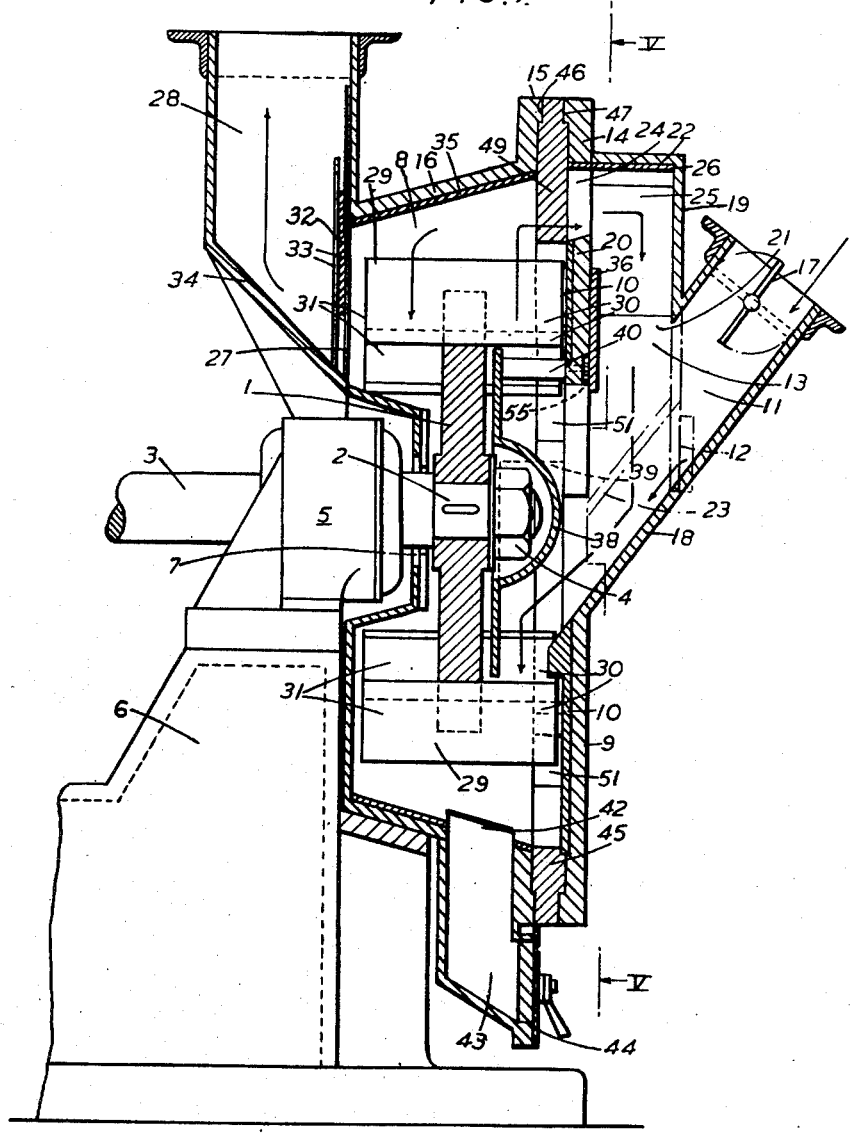

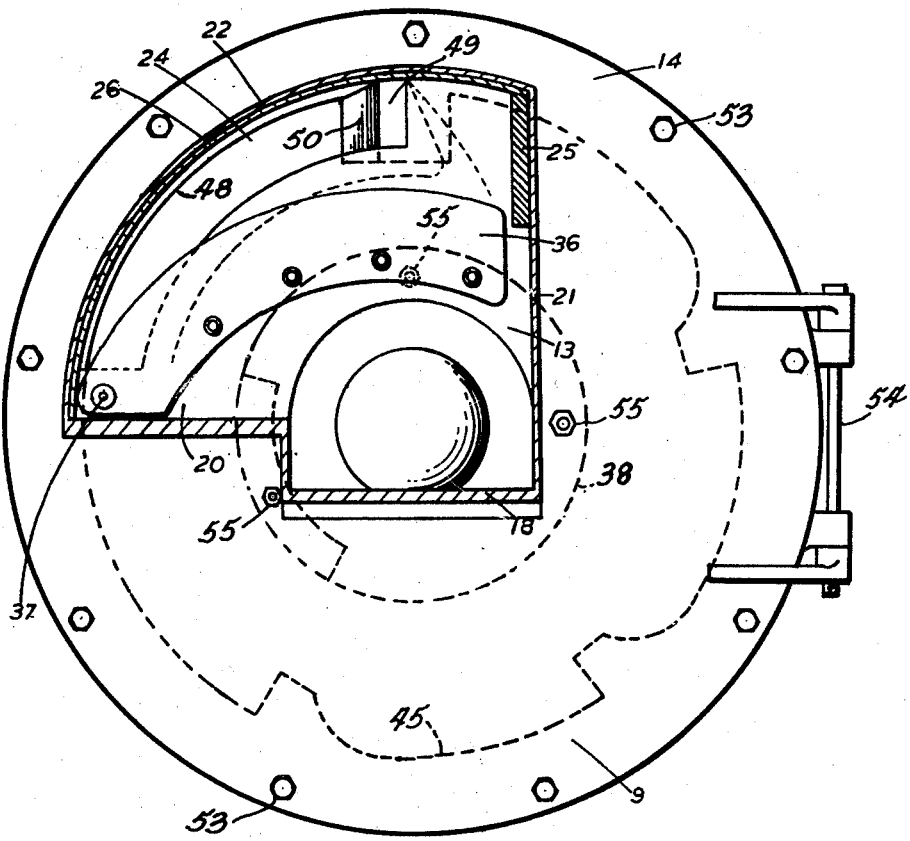

2,522,027

UNITED STATES PATENT OFFICE 2,522,027

PULVERIZER ARRANGED FOR RECIRCULATION AND CLASSIFICATION OF MATERIAL

Richard Henry Evans, London, England, assignor to The Babcock & Wilcox Company, Rockleigh, N. J., a corporation of New Jersey Application July 10, 1945, Serial No. 604,181
In Great Britain July 11, 1944

13 Claims. (Cl. 241—48)

1

This invention relates to improvements in pulverising mills of the kind described in the Patent Specification No. 2,361,278, comprising a rotary beater, including a circle of beater elements, disposed within a chamber arranged to be swept by gaseous fluid and means for introducing material to be pulverised into the chamber, together with directing means adapted to effect removal of oversize particles from a region within the chamber radially outward of the beater elements and to effect movement of the particles to a region sidewardly of the beater elements and radially inwards of the outer edges thereof and to direct the particles towards the zone of action of the beater elements.

One object of the invention is to improve the economy of operation of such mills. Another object is to provide a mill capable of effecting fine pulverisation at a relatively high rate of output. Another object is the provision of advantageous means for effecting classification of material within a mill.

The present invention includes a pulverising mill of the kind specified, wherein the rotor of the rotary beater is reversible on its driving shaft so as to present one side or the other to incoming material and wherein the rotor is formed with two circles of elements respectively on opposite sides thereof and each circle of elements is adapted to serve either as a circle of beater elements or as a circle of rejector elements.

The invention also includes a pulverising mill of the kind specified, comprising a circle of rejector elements provided on the rotor of the rotary beater adjacent the periphery thereof and means for varying the position of the radially outer boundary of an outlet for gaseous fluid and entrained pulverised particles disposed at the side of the circle of rejector elements.

The invention, moreover, includes a pulverising mill of the kind specified, wherein a wall at the side of the circle of beater elements is formed with an opening for the passage into a windbox for the reception of air supplied to the mill of oversize particles moving sidewardly from the region radially outward of the beater elements and the effective size of the opening is variable.

The invention furthermore includes a pulverising mill of the kind specified, wherein an impact surface surrounding the beater or a part or extension of the impact surface is shaped in a manner adapted to return oversize particles to the zone of action of the beater elements by directing the particles towards the outer edges of the beater elements.

2

The invention will now be described, by way of example, with reference to the accompanying drawings in which:

Figure 1 is a side view of a pulverising mill, an upper part being shown in section on the line I—I of Figure 2;

Figure 2 is a rear elevation of the mill, partly in section on the broken line II—II of Figure 1;

Figure 3 is a front elevation of the mill;

Figure 4 is a sectional side view taken on the line IV—IV of Figure 3;

Figure 5 is a sectional front view of a front plate of the mill and certain associated parts, taken on the broken line V—V of Figure 4;

Figure 6 is a front view showing a centre plate and slideway of the mill;

Figure 7 is a front view of a deflector ring;

Figure 8 is a sectional side view taken mainly on the line VIII—VIII of Figure 6; and Figure 9 is a fragmentary sectional view taken along the line IX—IX of Figure 7.

In describing the pulverising mill illustrated in the drawings it will be assumed that the mill is intended for use in conjunction with a pulverised fuel fired furnace, but it will be understood that the mill may be used to pulverise material other than coal and that gaseous entraining medium other than air may be used to carry away pulverised material from the mill.

In the drawings, a disc 1 forming the rotor of a rotary beater is keyed to an end part 2 of reduced diameter of a driving shaft 3 and is clamped in position on the shaft by a nut 4. The shaft 3 is rotatably mounted in a bearing 5 set on a pedestal 6 and extends through an aperture 7 in the rear wall of a beater chamber 8 in which the beater is arranged to operate.

The front plate 9 of the beater chamber is provided internally with a wear resisting lining 10 and is formed with a primary air inlet 11, a coal inlet 12, a windbox 13 and a peripheral part 14 whereby the plate is bolted or otherwise suitably secured to the radial flange 15 at the forward edge of the periphery 16 of the beater chamber, suitable bolted connections 53 being indicated at angularly distributed locations. If desired, the front plate 9 may be hinged to the periphery 16 of the beater chamber, by means of hinge structure 54 for example, when the peripheral part 14 is released from the flange 15, the front plate may be swung back to give access to the beater and the interior of the beater chamber.

The air inlet 11 is provided with a pivoted damper 17 for controlling the flow of air to the mill and any suitable means may be provided for feeding coal to the inlet 12, below which is a lower wall 18 of the windbox 13 sloping steeply towards the beater rotor 1 and terminating radially inwards of a circle of beater elements 30 referred to hereinafter. Besides the wall 18, the windbox includes a front wall 19, a rear wall 20, a vertical side wall 21, an arcuate upper wall 22 and a sloping lower wall 23. The rear wall 20 of the windbox is formed with an arcuate slot 24, the side wall 21 carries an impact block or target plate 25 and the upper wall 22 and the outer edge of the slot 24 are provided with a wear resisting lining 26.

Extending around the upper half of the beater chamber 8 and formed in the rear wall thereof is an arcuate outlet 27 for the primary air and entrained pulverised coal, which outlet communicates with a vertical outlet duct 28, connected when the mill is installed for use with a suction fan and formed with a forwardly sloping bottom wall 34. The fan may be mounted on a rear extension of the pedestal 6 and the fan and the beater 1 may be driven by a common power device at the same speed. Alternatively the speed of the beater may be varied independently of the speed of the fan, the beater being separately driven or driven through speed varying means by the same power device as the fan.

Extending radially beyond the periphery of the beater disc 1 and axially and symmetrically on opposite sides thereof are a number of rectangular plates 29 mounted on the disc at equiangularly spaced locations around the periphery thereof, the plates constituting beater elements 30 extending at the front of the beater disc and rejector elements 31 extending at the rear of the beater disc.

The effective radially outer boundary of the outlet 27 from the beater chamber 8 may, by means of a shutter 32, be varied from a position radially outwards of the rejector elements 31 to a position radially inwards of the radially outer edges of the rejector elements. The shutter 32 is slidable between guides 33 and is provided with suitable means (not shown) for holding the shutter in any selected position between the fully raised position shown by full lines in Figures 1 and 2 and the fully lowered position shown by chain lines in Figure 2 and chain lines in Figure 1 and by full lines in Figure 4. When the shutter is in the fully lowered position its upper and lower edges form arcs of circles having their centres on the axis of rotation of the shaft 3, its lower arcuate edge remaining spaced throughout from the inner arcuate boundary of outlet 27 so as to render a predetermined minimum area of outlet 27 continuously open for the discharge of air and material therethrough.

The periphery of the beater chamber 8 is of frusto-conical form, the larger diameter being at the front of the chamber, and is lined with a wear-resisting impact plate 35 spaced an appreciable distance from and surrounding the beater and rejector elements.

The effective size of the arcuate slot 24 is variable by means of a shutter 36 mounted by a pivot 37 on the rear wall 20 of the windbox. The shutter, which is substantially the same shape as but somewhat wider than the slot, may be rotated about the pivot 37 between the lowest position shown by full lines in Figure 5, when all but a small part of the slot at the lowest inner corner thereof is uncovered, and the highest position, shown by dotted lines, in which the shutter completely masks the slot. Suitable means, not shown, are provided for moving the shutter to any selected position within its range of movement and maintaining the shutter in the selected position.

Mounted on the front plate 9 of the beater chamber is a centre plate 38 formed with an arcuate slideway 39 extending between the centre plate and the front plate, the centre plate and slideway being clamped to the front plate by the shouldered studs 40 projecting from the centre plate and stud 41 projecting from the slideway, the studs 40 and 41 extending through portions of front plate 9 and being engaged by nuts 55 at their outer ends. The centre plate is positioned close to the beater disc 1 and is centrally dished in order to provide space for the nut 4. As shown in Fig. 3, for example, the slideway 39 presents an inner arcuate surface concentrically arranged with respect to the axis of beater rotation and having the greater portion of its length disposed in a lower quadrant below material inlet 12, and its remaining lesser length portion in the adjacent upper quadrant. The slideway thus presents an upwardly facing inner surface portion adapted to receive material from inlet 12, as delivered thereto along the sloping lower wall 18 of windbox 13; the material receiving surface of slideway 39 being inclined downwardly toward the path of rotation of beater elements 30 and, for a predetermined direction of beater rotation, causing material to be discharged therefrom in a direction opposed to the movement of elements passing below the slideway.

At the bottom of the periphery 16 of the beater chamber and of the impact plate 35, near the front thereof, is an aperture 42 leading to a trap chamber 43 provided with a door 44 for clearing lumps of iron or other rubbish which collect in the trap chamber. Suitable means may also be provided for rejecting tramp iron or the like contained in the coal being fed to the mill.

A ring 45, of the same internal diameter as the maximum diameter of the impact plate 35, is arranged between the flange 15 and the peripheral part 14 of the front plate 9 and is located by the annular flanges 46 and 47 on the said flange and peripheral part fitting within corresponding peripheral recesses in the sides of the ring. That portion of the ring adjacent the slot 24 is formed with an inner face 48 sloping from the back to the front side of the ring to form a continuation of the flaring surface of the impact plate. At its front edge the face 48 has the same diameter as the inner surface of the lining 26 of the wall 22 of the wind-box. Extending radially inwards from the ring 45, at a location near the end of the slot 24 adjacent the target plate 25, is a projection 49, formed with a face 50 sloping from the back to the front side of the ring in the direction of the target plate. Between the projection 49 and the end of the slot 24 remote from the target plate the ring 45 is provided on its inner edge with other projections 51 formed with inwardly curved surfaces 52.

During operation, primary air admitted through the inlet 11, after flowing radially outwards between the beater elements 30, flows radially inwards past the rejector elements 31 and passes together with the entrained pulverised coal through the outlet duct 28. The rate of air flow through the mill is controlled by variation of fan speed or/and by adjustment of the damper 17.

Coal fed at a suitable rate through the inlet 12, as by an automatic feeder, slides down the sloping wall 18 towards the space of the beater chamber 8 within the circle of beater elements 30 and falls at least largely onto the slideway 39. The beater 1 is rotated in a clockwise direction as seen in Figure 3 and the slideway 39 directs coal fed through the inlet 12 in a direction opposed to the direction of movement of the beater elements passing below the slideway so that the force of impact between the beater elements and the coal is increased. The centre plate 38 protects the parts screened thereby from the incoming coal and prevents the incoming coal from being whirled as a direct consequence of contact between the coal and the disc 1 of the rotary beater, or indirectly as a result of rotation of the incoming air following contact of the air with the disc. The incoming lumps of coal, being stuck by the beater elements 30, are flung against the impact plate 35.

In the operation of the mill, oversize particles striking the flaring impact plate 35 are directed towards the beater chamber front plate 9 in which the slot 24 is formed. By virtue of the fan action of the beater elements 30, air flows from the region of the beater chamber 8 radially outwards of the beater elements through the slot 24 back to the wind-box 13 and to the region within the circle of beater elements. Oversize particles carried by the recirculating air or/and directed forwardly by the impact plate pass from the beater chamber through the slot 24 and impact upon the target plate 25, from which they fall and are carried by the air or flow down the wall 18 to the region within the circle of beater elements. The sloping face 50 of the ring 45 serves to direct particles striking against the face towards the slot 24.

By adjusting the shutter 36, an optimum position may be found in which the desired recirculation of oversize particles is maintained, whilst the recirculation of air and the accompanying losses are limited.

Particles flung against the inner edge of the ring 45 or whirling within the ring and reaching the curved surfaces 52 are directed radially inwards. Some of the heavier particles are thereby flung back onto the beater elements 30 and impacting between the moving particles is produced and in general the rubbing of the moving particles with one another is increased, with the result that the speed of grinding is improved.

Should the beater elements 30 become worn, the beater disc 1 may readily be removed from the shaft 2 and replaced thereon in reversed position, so that those elements which previously served as beater elements act as rejector elements and those elements which previously served as rejector elements are positioned to serve as beater elements.

It will be understood that as the incoming coal and recirculated oversize particles are fed to the region within the circle of beater elements 30, the wear of those elements decreases progressively from the inner towards the outer edges thereof and that elements which have become worn simply as beater elements are relatively sound so far as the radially outer portions are concerned, so that the said elements are able effectively to serve as rejector elements.

The rejector elements 31 serve to maintain a high velocity of whirl of the mixture of air and pulverised material in the vicinity of the rejector elements, with the result that the oversize particles present in the mixture are effectively thrown outwardly and are deflected by the impact plate 35 towards the front plate of the mill.

Besides operating to reject the oversize particles, the rejector elements, by maintaining the high velocity of whirl over the rear part of the beater chamber, increase the rubbing action between the particles of material being ground. A rubbing and impacting between particle and particle is essential for the purpose of fine pulverisation, since the smaller oversize particles, being air-borne, escape impact with the beater elements.

The violent recirculation of the oversize particles, the changes of direction in the recirculating path and the action of the inwardly curved surfaces on the ring 45 all promote the desired rubbing and impacting between the particles.

If only a relatively coarse pulverisation is required, the sliding shutter 32 is raised to its highest position, when the stream of air and entrained particles is able to leave the beater chamber 8 without flowing radially inwards past the rejector elements 31. On the other hand, if the finest pulverisation is required, the sliding shutter is moved to its lowermost position, when the stream of air and entrained pulverised material is forced to flow inwardly through the circle of rejector elements before leaving the beater chamber, with the result that the coarser particles are flung outwardly. Intermediate degrees of pulverisation may be obtained by adjusting the sliding shutter to corresponding positions.

Owing to the substantial clearance between the radially outer edges of the beater elements 30 and rejector elements 31 and the impact plate 35, jamming of material between the said elements and plate is avoided.

From the above description it will be understood that I have provided a mill which is readily maintained, which is able to effect fine pulverisation at a high rate of output and which effects accurate and adjustable classification of the air-borne particles within the mill.

I claim:

1. In an air swept pulverizer, a rotatable beater comprising an imperforate disc-like support together with circumferentially spaced beater elements mounted peripherally of said support and projecting therefrom in a circular row at each of its opposite sides, a stationary casing having a circumferential impact surface surrounding said beater and defining a clearance region of considerable radial extent therebetween, said casing having inlet means at one side of said beater for air and for material to be pulverized and having an outlet at the opposite side of said beater for air and entrained pulverized material, and radially movable shutter means arranged adjacent one end of said impact surface for varying the effective flow path of material to and through said outlet, said shutter means in one position defining a path directing substantially all of said outgoing air-borne material between beater elements projecting from the outlet side of said support and in another position defining a path directly connecting said clearance region to said outlet and thereby causing a major portion of said outgoing material to bypass said last named elements, said outlet having an outer boundary radially outward of the outer periphery of said beater elements and having an inner boundary radially inward of the inner periphery of said elements, said shutter means having an inner edge portion movable transversely of said outlet between said outer and inner boundaries thereof.

2. In an air swept pulverizer, a rotatable beater comprising a substantially imperforate disc-like support together with a circular row of beater blades extending radially beyond the periphery of said support and projecting therefrom at opposite sides, a stationary casing having a circumferential impact surface surrounding said beater and radially spaced therefrom, said casing having inlet means at one side of said beater for air and for material to be pulverized, said casing having an outlet at the opposite side of said beater for air and entrained pulverized material, and radially movable shutter means arranged adjacent one end of said impact surface for varying the effective flow path of material to and through said outlet, said shutter means in one position defining a path of minimum flow area causing substantially all of said outgoing air-borne material to pass between beater elements projecting from the outlet side of said support and in other positions defining flow paths of increasing flow areas causing increasing portions of said outgoing material to bypass said last named elements, said outlet having radially spaced outer and inner boundaries of which the outer boundary is coextensive with said impact surface and the inner boundary is disposed radially inward of the rotational path of movement of beater blades at said outlet side, said shutter means presenting a concave edge portion toward the axis of said rotational path for defining the effective radially outer boundary of said outlet, and stop means arranged to prevent radially inward movement of said shutter means at a position rendering a predetermined area of said outlet continuously effective.

3. In a pulverizer, a rotatable beater comprising a substantially imperforate disc-like support together with a circular row of beater elements extending beyond the periphery of said support and projecting therefrom at oppostie sides, a stationary casing having a transverse wall at one side of said beater providing an inlet for air and raw material and a transverse wall at the opposite side of said beater providing an outlet for air and pulverized material, said casing having a circumferential impact surface of frusto-conical formation having its minimum diameter adjacent said outlet wall, said outlet having an effective radially outer marginal portion variable as to its distance from the axis of rotation of said beater, and means defining said effective marginal portion comprising radially movable shutter plate means arranged transversely of said impact surface adjacent said end of minimum diameter, said shutter plate means presenting a radially inner edge portion of arcuate formation which in an extreme position of movement is substantially concentric with said impact surface about said axis.

4. In a pulverizer, a rotatable beater comprising a substantially imperforate disc-like support together with a circular row of beater elements extending beyond the periphery of said support and projecting therefrom at opposite sides, a stationary casing having a transverse wall at one side of said beater providing an inlet for air and raw material and a transverse wall at the opposite side of said beater providing an outlet for air and pulverized material, said casing having a circumferential impact surface of frusto-conical formation having its minimum diameter adjacent said outlet wall, said outlet being confined substantially to an area of said outlet wall at one side of a plane containing the axis of rotation of said beater, said outlet having radially inner and outer marginal portions of which the outer of said portions is rendered effective at different distances from said axis, said inner and outer marginal outlet portions lying respectively radially inward and radially outward of the path of rotation of said beater elements and shutter plate means arranged and movable normal to said axis and presenting a radially inner concavedly curved edge portion movable between said marginal outlet portions and defining said effective outer marginal outlet portion at said different distances from said axis.

5. In a pulverizer having a beater rotatable about a horizontal axis, said beater comprising a substantially imperforate disc-like support together with radially extending plate-like elements projecting therefrom in a circular row at each of its opposite sides, a stationary casing having an inlet for air and raw material at one of said sides and having an outlet for air and pulverized material at the other of said sides, said casing having a circumferential impact surface terminating at said outlet at a diameter radially outward of the path of rotation of said plate-like elements, said outlet having radially inner and outer boundaries of which the inner of said boundaries is positioned radially inwardly of said path and the outer of said boundaries is coextensive with said impact surface, means for rendering said outer boundary effective at different distances from said axis comprising shutter means having a curved lower edge portion movable from a position radially outward of the outer periphery of said path of rotation to a position radially inward of said periphery, and means for separately regulating the rate of air flow through said pulverizer.

6. In a pulverizer having a beater rotatable about a horizontal axis, said beater comprising a substantially imperforate disc-like support together with radially extending plate-like elements projecting therefrom in a circular row at each of its opposite sides, a stationary casing having an inlet for air and raw material at one of said sides and having an outlet for air and pulverized material at the other of said sides, said casing having a circumferential impact surface terminating adjacent said outlet at a diameter radially outward of the path of rotation of said plate-like elements, said outlet being confined to an area above said axis and having radially inner and outer boundaries of which the inner of said boundaries is of arcuate formation about said axis, means defining the outer of said boundaries comprising shutter means radially movable with respect to said axis and presenting an arcuate edge portion substantially concentric with said inner arcuate boundary at an extreme position of movement of said shutter means, and a suction fan inlet duct leading from said outlet and having a lower wall portion sloping downwardly to the position of said inner boundary radially inward of said row of beater elements at said outlet side.

7. In a pulverizer, a beater rotatable about a horizontal axis and comprising an imperforate disc-like support together with circumferentially spaced beater elements projecting therefrom in a circular row at the material inlet side, a beater compartment wall having a material inlet axially opposite the space inside said row of projecting beater elements, means connected to said inlet for directing material into said inside space, a shaft on which said beater is mounted terminating within said space at the beater side of said wall, and a stationary center plate screening said beater support together with said shaft from contact by material entering said space.

8. In a pulverizer, a beater rotatable about a horizontal axis and comprising an imperforate disc-like support together with circumferentially spaced beater elements projecting symmetrically therefrom in a circular row at each of its opposite sides, a casing having an inlet wall at one end of a compartment housing said beater, said beater compartment wall having a material inlet axially opposite the space inside the adjacent row of said projecting beater elements, means connected to said inlet having a downwardly inclined lower wall portion terminating within said inside space for effecting delivery of material mainly by gravity into said space, a shaft on which said beater is reversibly mounted terminating within said space at the beater side of said wall, a stationary center plate positioned closely adjacent the inlet side of said beater support for screening said support together with said shaft from contact by material entering said inside space, circumferentially spaced spacer means assembling said center plate to said inlet wall, and means for releasably clamping said inlet wall to said casing whereby release of said clamping means releases said wall and the assembled screening plate for movement to a position rendering said beater and the interior of said beater compartment accessible.

9. In a pulverizer, a beater rotatable about a horizontal axis and comprising an imperforate disc-like support together with circumferentially spaced beater elements projecting therefrom in a circular row at the material inlet side, a beater compartment wall having a material inlet axially opposite the space inside said row of projecting beater elements, means connected to said inlet for directing material into said inside space, a slideway element between said support and said wall having an arcuate surface in a lower quadrant of said space arranged to receive material entering said space, said arcuate surface extending downwardly along an arc of said quadrant and terminating within a lower portion of said quadrant whereby material received on said surface is discharged therefrom in a direction opposed to the direction of beater rotation, a shaft on which said beater is mounted terminating between said beater support and said inlet, and a stationary imperforate disc-like member positioned adjacent the axially inner margin of said slideway surface and screening said beater support together with said shaft from contact by material entering said space, said screening member supporting said slideway element.

10. In an air swept pulverizer, a beater rotatable about a horizontal axis and comprising a substantially imperforate disc-like support having beater elements projecting therefrom in a circular row at its material inlet side, a stationary casing having a transverse wall dividing the interior casing space to provide a beater chamber at one side of said wall and a windbox compartment at the opposite side, said beater chamber having a circumferential impact surface radially spaced from the path of rotation of said beater to define an annular clearance region therebetween, said wall having an opening axially opposite the space inside said row of beater elements and an upper opening axially opposite said annular clearance region, means for directing air and raw material into said compartment and through said first named opening, said windbox compartment embracing both of said openings and having an upright target wall circumferentially spaced from said upper opening in the direction of beater rotation, shutter means arranged to regulate the effective flow area of said upper opening including reduction of said area progressively toward said target surface, and support means with respect to which said shutter means is movable into a position of complete closure over said upper opening.

11. In an air swept pulverizer, a beater rotatable about a horizontal axis and comprising a substantially imperforate disc-like support having beater elements projecting therefrom in a circular row at its material inlet side, a stationary casing having a transverse wall dividing the interior casing space to provide a beater chamber at one side of said wall and a windbox compartment at the opposite side, said beater chamber having a circumferential impact surface radially spaced from the path of rotation of said beater to define an annular clearance region therebetween, said wall having an opening axially opposite the space inside said row of beater elements and an upper opening of arcuate slot-like formation axially opposite said annular clearance region, means for directing air and raw material into said compartment and through said first named opening, said windbox compartment extending over an area of said wall including both of said openings and being mainly confined to an upper quadrant of said wall, said windbox compartment having an upright target wall circumferentially spaced from said upper opening in the direction of beater rotation, shutter means arranged to regulate the effective flow area of said upper opening including reduction of said area progressively toward the radially outer boundary thereof and simultaneously toward said target surface, and a pivot support about which said shutter means is movable into a position of complete closure over said upper opening.

12. In an air swept pulverizer, a beater rotatable about a horizontal axis and comprising a substantially imperforate disc-like support having beater elements projecting therefrom in a circular row at its material inlet side, a stationary casing having a transverse wall dividing the interior casing space to provide a beater chamber at one side of said wall and a windbox compartment at the opposite side, said beater chamber having a circumferential impact surface radially spaced from the path of rotation of said beater to define an annular clearance region therebetween, said wall having an opening axially opposite the space inside said row of beater elements and an upper opening of arcuate slot-like formation axially opposite said annular clearance region, means for directing air and raw material into said compartment and through said first named opening, said windbox compartment extending over an area of said wall including both of said openings and being mainly confined to an upper quadrant of said wall, said windbox compartment having an upright target wall circumferentially spaced from said upper opening in the direction of beater rotation, and a shutter plate arranged for movement relative to said upper opening for regulating the effective flow area thereof, said shutter plate conforming in outline substantially to the perimeter of said upper opening and having a pivot support adjacent the end of said opening circumferentially remote from said target plate, said pivot support being positioned on an arc with said arcuate opening for movement of said shutter plate into a position wherein said plate completely overlaps said arcuate opening.

13. In an air swept pulverizer, a beater rotatable about a horizontal axis and comprising a substantially imperforate disc-like support having beater elements projecting therefrom in a circular row at its material inlet side, a stationary casing having a transverse wall dividing the interior casing space to provide a beater chamber at one side of said wall and a windbox compartment at the opposite side, said beater chamber having a circumferential impact surface radially spaced from the path of rotation of said beater to define an annular clearance region therebetween, said wall having an opening axially opposite the space inside said row of beater elements and an upper opening axially opposite said annular clearance region, means for directing air and raw material into said compartment and through said first named opening, said windbox compartment embracing both of said openings and having an upright target wall circumferentially spaced from said upper opening in the direction of beater rotation, and means adjacent the beater side of said transverse wall forming a projection extending radially inward with respect to said impact surface and having a surface arranged to deflect material sidewardly through said upper opening toward said target surface.

RICHARD HENRY EVANS.

REFERENCES CITED

The following references are of record in the file of this patent:

UNITED STATES PATENTS

| Number | Name | Date |
|---|---|---|
| 50,975 | Whelpley et al. | Nov. 14, 1865 |
| 196,039 | Phelps | Oct. 9, 1877 |
| 539,507 | Elliott | May 31, 1895 |
| 587,127 | Smith | July 27, 1897 |
| 587,501 | Day | Aug. 3, 1897 |
| 795,133 | Johnson | July 18, 1905 |
| 1,120,250 | Sturterant | Dec. 8, 1914 |
| 1,384,821 | Blum | July 19, 1921 |
| 1,621,571 | Witz | Mar. 22, 1927 |
| 1,770,198 | Chappel | July 8, 1930 |
| 1,963,204 | Kutaszewicz | June 19, 1934 |
| 2,016,496 | Holbeck | Oct. 8, 1935 |
| 2,105,766 | Francis | Jan. 18, 1938 |
| 2,361,278 | Evans | Oct. 24, 1944 |

FOREIGN PATENTS

| Number | Country | Date |
|---|---|---|
| 40,201 | France (addition to 714,302) | Jan. 30, 1932 |